United States Patent [19]

Rogers

[11] 4,190,755
[45] Feb. 26, 1980

[54] SWITCH OPERATOR UNCOUPLING MECHANISM

[75] Inventor: Edward J. Rogers, Chicago, Ill.

[73] Assignee: S & C Electric Company, Chicago, Ill.

[21] Appl. No.: 911,124

[22] Filed: May 31, 1978

[51] Int. Cl.² ............................................. H01H 9/20
[52] U.S. Cl. .................................................. 200/334
[58] Field of Search ............... 200/334, 331, 329, 330, 200/332

[56] References Cited

U.S. PATENT DOCUMENTS

| 3,652,815 | 3/1972 | Davies | 335/76 X |
| 3,980,977 | 9/1976 | Evans | 310/105 X |

Primary Examiner—Harry N. Haroian
Attorney, Agent, or Firm—Kirkland & Ellis

[57] ABSTRACT

Disclosed is an operating mechanism for high voltage switches that incorporates certain uncoupling, drawout, and interlocking features. The operating mechanism is mounted on rollers which roll in tracks on upper and lower mounting brackets attached to the side of the equipment enclosure also containing the high voltage switches. A latching mechanism secures the switch operating mechanism in its test and maintenance positions. By operating a drawout latch lever which is located on the control panel of the operating mechanism on the outside of the equipment enclosure, the latching mechanism can release the switch operating mechanism from the test or maintenance positions permitting it to be reinserted or withdrawn farther. The drawout latch lever on the control panel of the switch operating mechanism also indicates when the switch operating mechanism is in the test or maintenance positions. The coupled position of the switch operating mechanism is sensed electrically by a position indicating switch. A locking mechanism prevents any movement of the high voltage switch while the door of the equipment enclosure is in a predetermined position or while the switch operating mechanism is uncoupled. An indicator on the control panel indicates the position of the high voltage switch.

8 Claims, 11 Drawing Figures

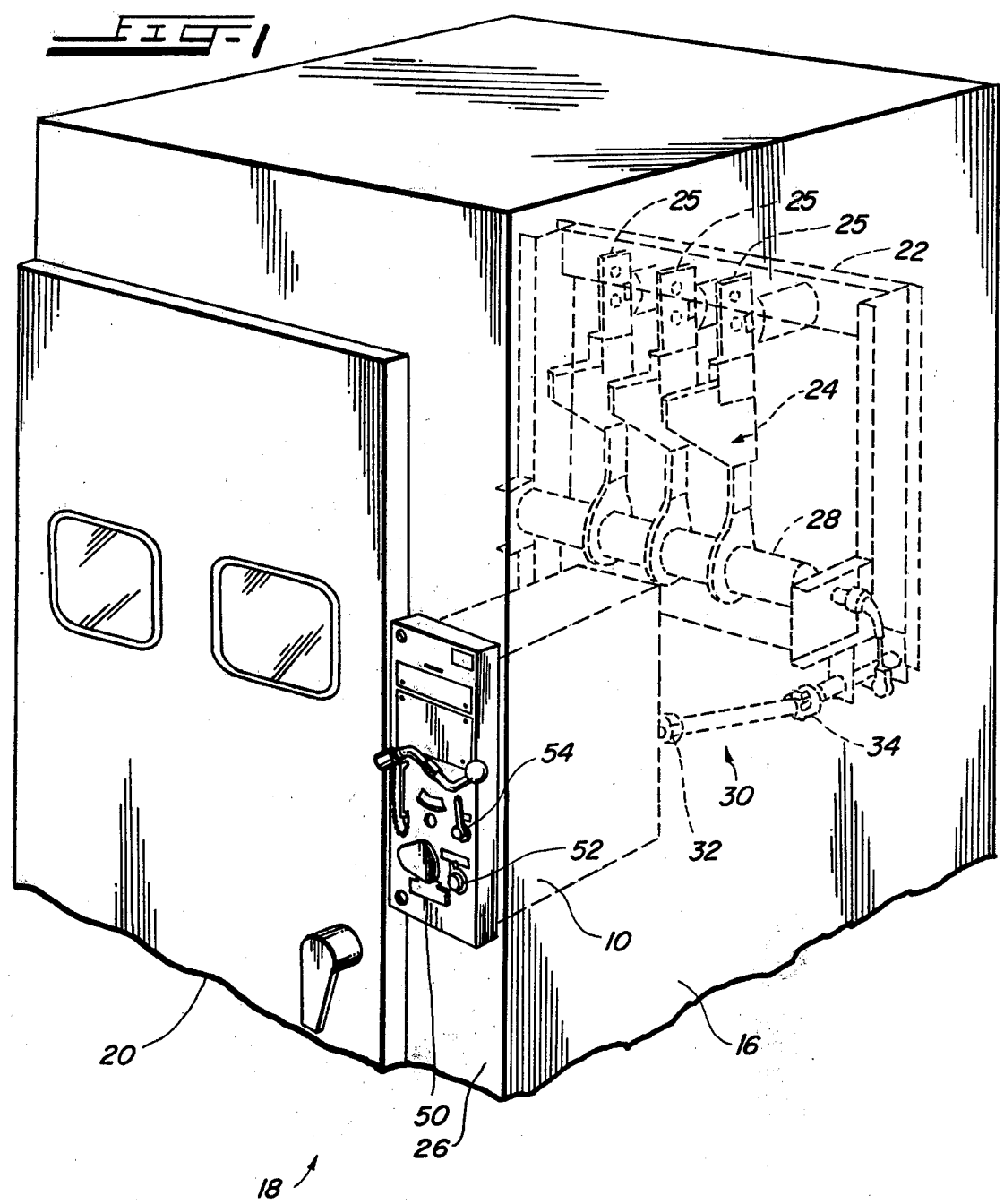

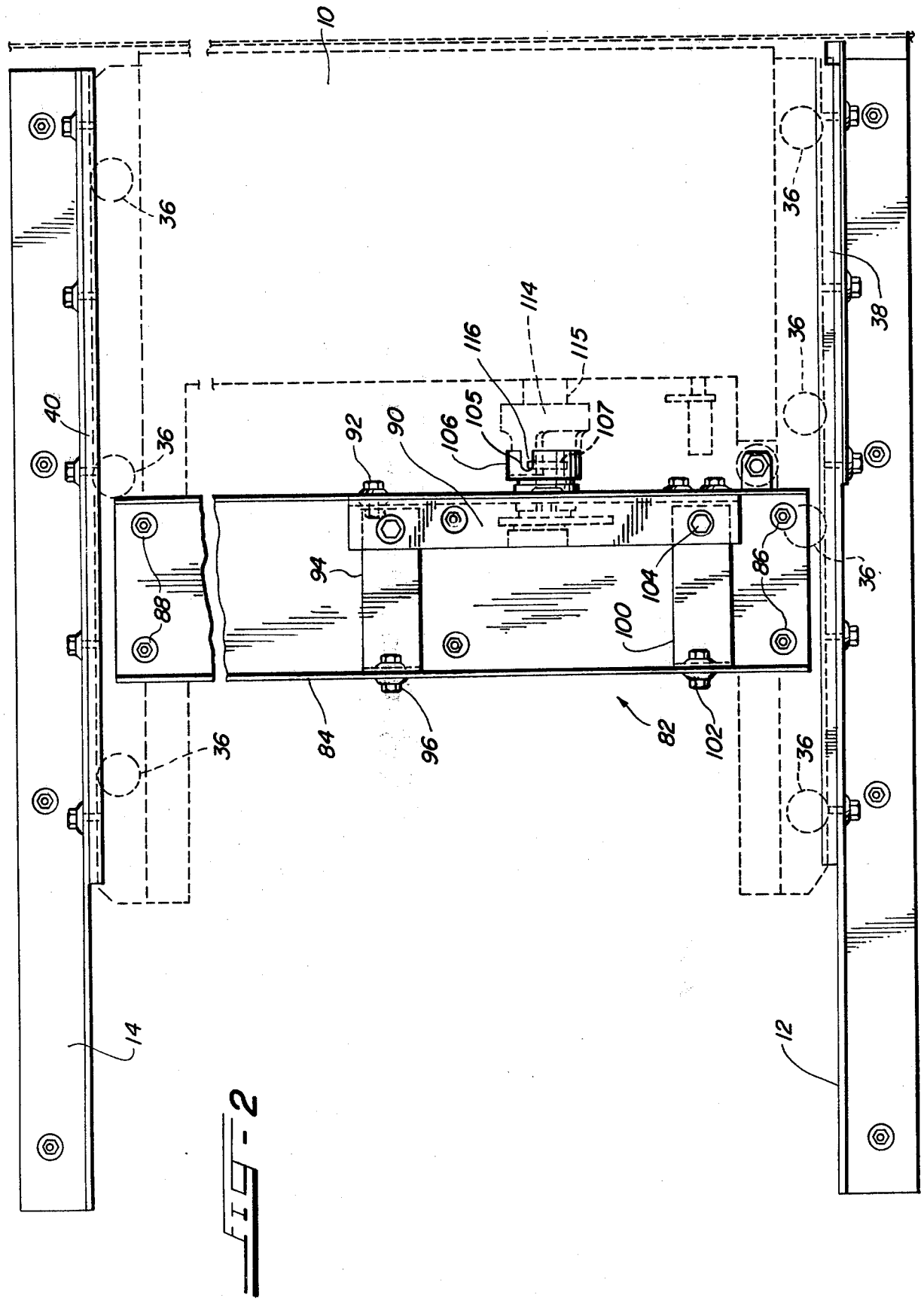

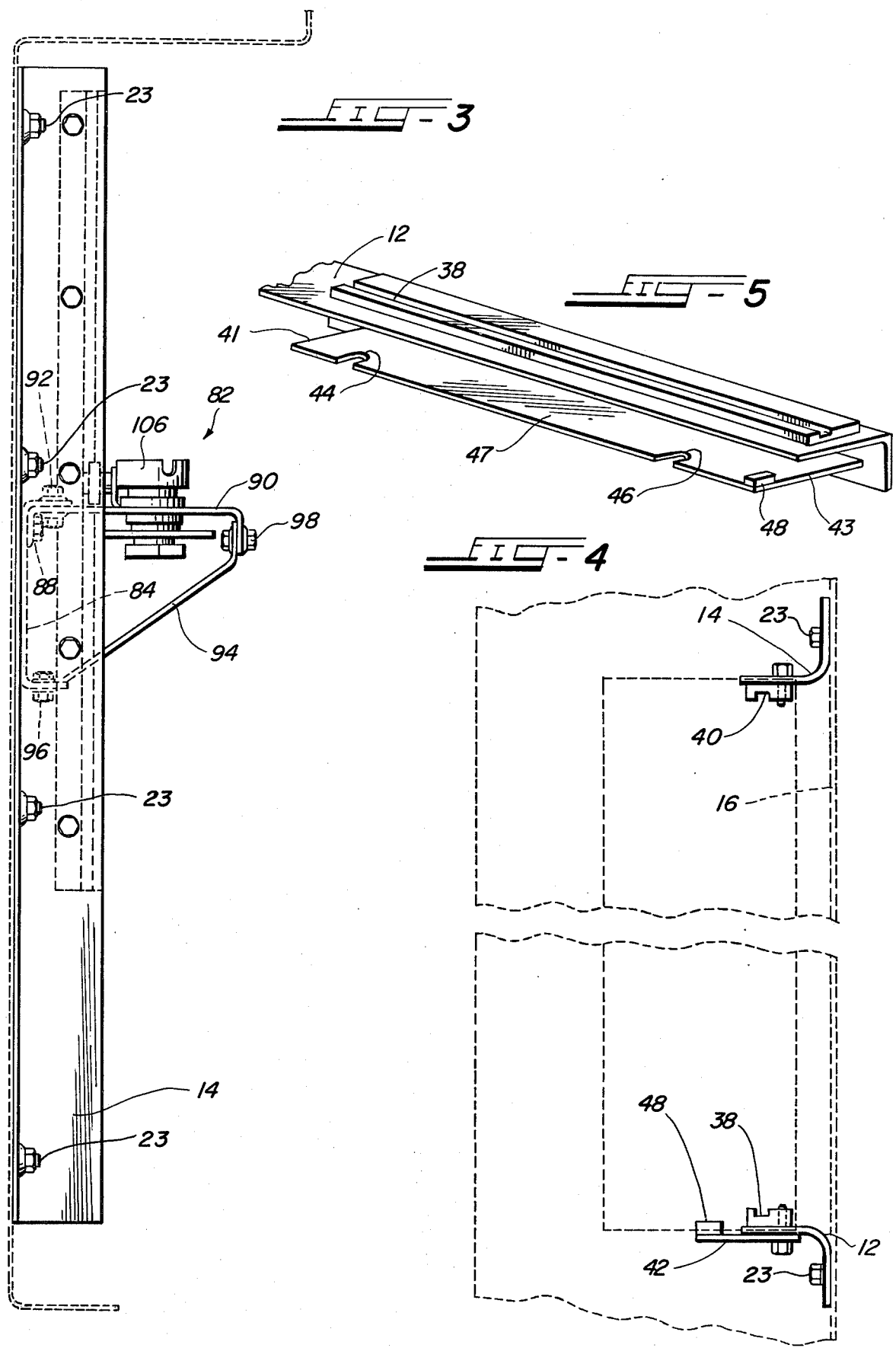

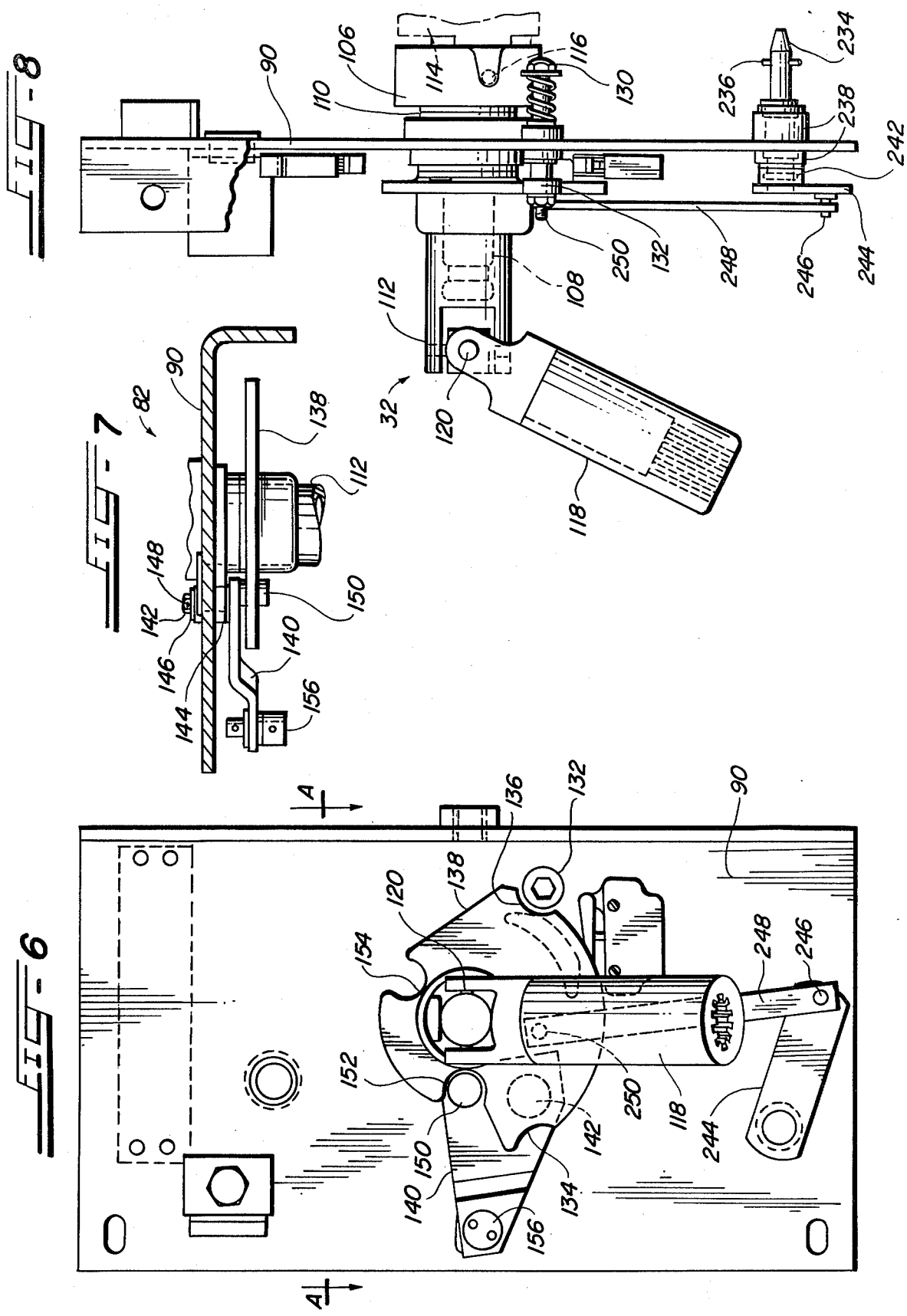

SWITCH OPERATOR UNCOUPLING MECHANISM

BACKGROUND OF THE INVENTION

1. Field of the Invention

The present invention relates to mechanisms for operating high voltage switches, and more particularly, to a switch operating mechanism that can be uncoupled from the high voltage switches, withdrawn from the equipment enclosure, and exercised or maintained without interrupting the circuit controlled by the high voltage switch.

2. Description of the Prior Art

Drawout type circuit breakers for use in metal enclosed switchgear are well known. The drawout breaker is generally mounted on a wheeled carriage which may be rolled into the bay of the metal enclosure. High voltage power connections to the circuit breaker are made with separable contacts at the rear of the breaker. When the breaker is fully inserted into the bay of the enclosure, the high voltage contacts are engaged and the control wiring contacts to the circuit breaker also are engaged. If maintenance is required to be performed on the circuit breaker or if complete removal from the bay of the enclosure is required to guarantee isolation of the circuits at the controlled point, the entire drawout breaker may be withdrawn completely out of the switchgear. However, if it is desired to exercise the breaker or verify that its control circuits and mechanical functions are intact, it is typical in the art for the breaker to have a so-called test position in which the breaker is withdrawn from its normal position sufficiently to disengage from the high voltage contacts but in which the separable control contacts remain engaged. Thus, in this position the breaker can be operated to open and close without interrupting the high voltage circuit.

Prior switch operating mechanisms such as those which are described in U.S. Pat. No. 3,563,102—Bernatt, et al., issued Feb. 16, 1971, and U.S. Pat. No. 3,980,977—Evans, issued Sept. 14, 1976, both of which are assigned to the same assignee as the present invention, do not provide a means for uncoupling the switch operating mechanism from the high voltage switch to allow the switch operating mechanism to be exercised or maintenance to be performed. Therefore, in order to exercise a prior art switch operating mechanism to verify that the control circuits and mechanical functions are intact it is necessary to operate the high voltage switch and thereby interrupt the high voltage circuits.

It is desirable to incorporate the uncoupling and drawout features of drawout circuit breakers into switch operating mechanisms for high voltage switches. Therefore, it would be a desirable advance in the art to provide a switch operating mechanism such as the one described in the co-pending U.S. patent application entitled "HIGH VOLTAGE SWITCH OPERATING MECHANISM", Ser. No. 911,123, filed May 31, 1978, and assigned to the same assignee as the present invention, that incorporated a drawout concept which would permit the switch operating machanism to be exercised without interrupting the high voltage switch. It would also be a desirable advance in the art to provide a switch operating mechanism which could be uncoupled from the high voltage switch and withdrawn from the equipment enclosure to provide access for maintenance of the switch operating mechanism. The invention disclosed in the present patent application is related to the co-pending, commonly-assigned U.S. patent application entitled "LATCHING MEANS FOR SWITCH OPERATOR UNCOUPLING MECHANISM," Ser. No. 911,122, filed May 31, 1978.

BRIEF DESCRIPTION OF THE INVENTION

An improved switch operating mechanism for operating a high voltage switch between opened and closed and between closed and opened positions in accordance with the present invention comprises a switch operating mechanism slidably mounted on upper and lower mounting brackets that are suitably secured to the inside wall of a metal equipment enclosure. Rollers which are suitably secured to the frame of the switch operating mechanism roll in upper and lower tracks suitably fastened to upper and lower mounting brackets, respectively. The rollers and tracks provide the means for supporting the switch operating mechanism on the inside wall of a metal switchgear enclosure and permit the switch operating mechanism to be freely withdrawn and inserted through the front of the enclosure. A clutch assembly is provided for coupling the output drive shaft of the switch operating mechanism to a stationary drive shaft which is operably connected to the high voltage switch. A coupler pin on the output shaft of the switch operating mechanism engages a pin receptacle on the stationary drive shaft when the switch operating mechanism is fully inserted into the equipment enclosure. Thus, the output shaft of the switch operating mechanism rotates conjointly with the drive shaft when the switch operating mechanism is fully inserted into the equipment enclosure. The drive shaft can be operably coupled to the high voltage switch by means of a linkage assembly utilizing first and second universal joints which permit the high voltage switch to be mounted within a range of heights in the rear of the equipment enclosure.

A latching mechanism is provided for securing the switch operating mechanism in a test position in which the switch operating mechanism is withdrawn from the equipment enclosure far enough to uncouple the switch operating mechanism from the stationary drive shaft or in a maintenance position in which the switch operating mechanism is withdrawn farther from the equipment enclosure to make it accessible for performing maintenance, and for preventing the switch operating mechanism from being inadvertantly withdrawn completely out of the equipment enclosure. A latch pin is provided which engages notches in a latch bracket that is suitably secured to the lower mounting bracket. A handle indicator on the front control panel of the switch operating mechanism is operably connected to the latch pin and provides a means for retracting the latch pin to permit the withdrawal or insertion of the switch operating mechanism.

Also provided is a locking mechanism which prevents the high voltage switch from changing its opened or closed position while the switch operating mechanism is in an uncoupled postion. An interlock disk is provided which is rigidly mounted on the drive shaft and which turns conjointly with the drive shaft. A locking disk which is engagable with a first or second notch in the interlock disk and which thus prevents rotation of the interlock disk is provided. Also provided is a pin which is operably connected to the door of the equipment enclosure by a bowden cable and which is engagable with a second pair of notches on the interlock disk to prevent its rotation and the resultant change of switch position when the door of the equipment enclosure is in a predetermined position.

A limit switch is also provided for electrically sensing that the switch operating mechanism is in the coupled position.

Thus, it is a primary feature of the present invention to provide an operating mechanism for high voltage switches which provides for uncoupling of the drive linkage between the high voltage switch and the operating mechanism in order to allow the operating mechanism and associated control circuits to be exercised without interrupting the high voltage line being controlled by the high voltage switch.

It is a further object of the present invention to provide an operating mechanism for high voltage switches which may be uncoupled from the high voltage switch and withdrawn and secured by a latching mechanism in a test position or in a second position for inspection and maintenance, or which may be completely withdrawn from the equipment enclosure.

It is yet a further object of the present invention to provide an operating mechanism for high voltage switches which provides for the transmission of energy and intelligence between the front of the equipment enclosure and the high voltage switch positioned in the rear of the enclosure.

It is another object of the present invention to provide a clutch assembly for a switch operating mechanism which uncouples the switch operating mechanism from the high voltage switch when the switch operating mechanism is withdrawn to a test or maintenance position.

It is another object of the present invention to provide an operating mechanism for high voltage switches in which the energy storage mechanism and the indicating and control mechanisms are mounted in a drawout assembly near the front of the equipment enclosure.

It is another object of the present invention to provide an operating mechanism for high voltage switches in which the elevation at which the high voltage switch can be mounted in the equipment enclosure is variable within a range suitable for a number of different applications.

It is another object of the present invention to provide a locking mechanism which prevents movement of the high voltage switch when the switch operating mechanism is uncoupled.

It is another object of the present invention to provide an interlocking mechanism to prevent the high voltage switch from being opened or closed by the switch operating mechanism unless the door of the equipment enclosure is closed.

It is another object of the present invention to provide an indicator on the control panel of the switch operating mechanism to indicate the open or closed position of the high voltage switch.

It is another object of the present invention to provide electrical sensing and indicating of the coupled position of the switch operating mechanism to the switch drive linkage.

These and other objects, advantages, and features will hereinafter appear, and for purposes of illustration, but not for limitation, exemplary embodiments of the present invention are illustrated in the accompanying drawings.

BRIEF DESCRIPTION OF THE DRAWINGS

FIG. 1 is a perspective view of the preferred embodiment of the present invention showing the linkage between the high voltage switches and the switch operating mechanism.

FIG. 2 is a side partially fragmentary elevational view of the uncoupling clutch mechanism of the present invention.

FIG. 3 is a top view of the uncoupling clutch mechanism of the present invention.

FIG. 4 is a front view of the mounting mechanism of the present invention.

FIG. 5 is a perspective view of the lower mounting bracket and latch bracket of the present invention.

FIG. 6 is a rear view of the preferred embodiment of the present invention showing the switch interlock assembly.

FIG. 7 is a cross-sectional partially fragmentary view of the switch interlock mechanism of the present invention taken substantially along line A—A in FIG. 6.

FIG. 8 is a partially fragmentary side elevational view of the clutch mechanism of the present invention.

DETAILED DESCRIPTION OF THE PREFERRED EMBODIMENT

Figure 9:
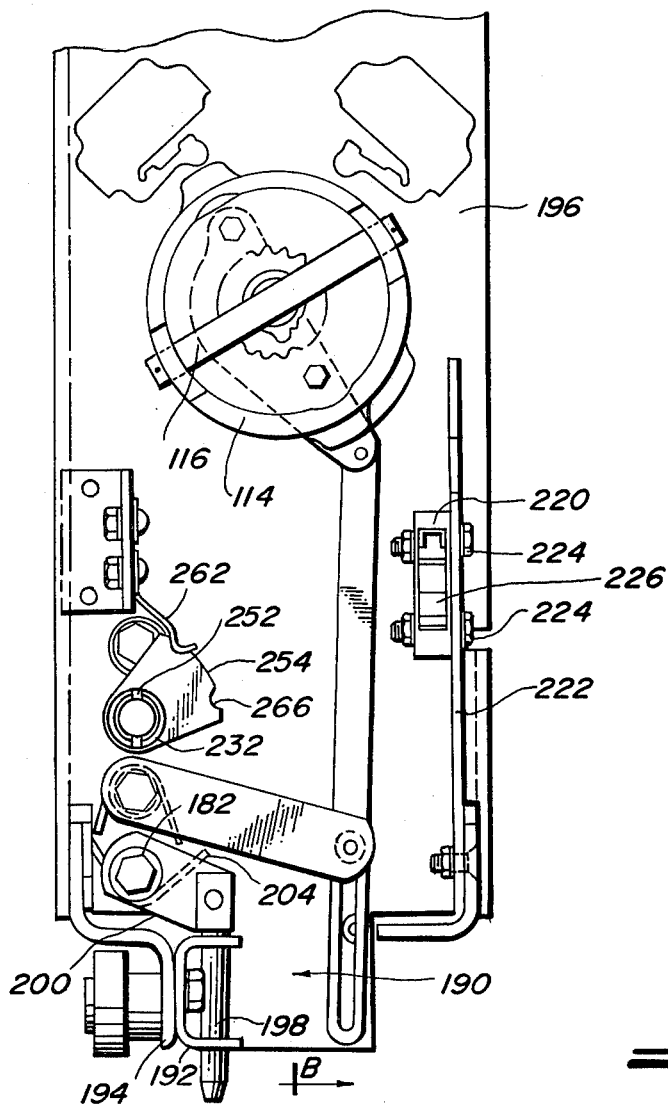
FIG. 9 is a rear view of the present invention showing the latching mechanism.

With reference to FIGS. 1 and 2, switch operating mechanism 10 is slidably mounted by lower mounting bracket 12 and upper mounting bracket 14, which are suitably secured to side wall 16 of equipment enclosure 18. Switch operating mechanism 10 can comprise a mechanism such as the one described in the co-pending U.S. patent application entitled "High Voltage Switch Operating Mechanism", Ser. No. 911,123 filed May 31, 1978, and assigned to the same assignee as the present invention. Upper mounting bracket 14 and lower mounting bracket 12 can be bolted, for example, to studs 23 welded to the interior of wall 16. Equipment enclosure 18 contains door 20 and rear wall 22 on which is mounted high voltage switch assembly 24 (only partially shown in FIG. 1) containing high voltage switches 25. Switches typical of the high voltage switches that can be operated by the present invention are described in U.S. Pat. No. 3,563,102—Bernatt, et al., issued Feb. 16, 1976, and in U.S. Pat. No. 3,980,977—Evans, issued Sept. 14, 1976, both of which are assigned to the same assignee as the present invention. Control panel 50 of switch operating mechanism 10 is positioned on the exterior of front 26 of equipment enclosure 18. Switches 25 in high voltage switch assembly 24 are opened and closed by rotation of shaft 28 in first and second directions, respectively. Switch drive linkage assembly 30 operably interconnects shaft 28 and drive shaft 108 (see FIG. 8) so that shaft 28 is caused to rotate when drive shaft 108 rotates. First universal joint 32 and second universal joint 34 in drive linkage assembly 30 allow the height at which switch assembly 24 is mounted on rear wall 22 to vary so as to be optimally suited for each particular application.

FIG. 4 shows a front view of upper mounting bracket 14 and upper track 40 and of lower mounting bracket 12 and lower track 38. With reference to FIGS. 4 and 5, tracks 38 and 40 are comprised of suitable groves or guides for engaging rollers 36. Rollers 36 (see FIG. 2) are suitably mounted to the frame of switch operating mechanism 10 and roll in tracks 38 and 40, thus providing support for switch operating mechanism 10 and allowing it to be withdrawn from and inserted into equipment enclosure 18 by rolling it in tracks 38 and 40. In addition to lower track 38, latch bracket 42 is also suitably secured to lower mounting bracket 12. Latch bracket 42 contains test position notch 44 and maintenance position notch 46. Stop block 48 is suitably secured to front edge 43 of latch bracket 42. The function of latch bracket 42 is described in detail below.

FIG. 2 shows a side elevational view of clutch assembly 82. Shown in phantom in FIG. 2 is switch operating mechanism 10 with its rollers 36 which roll in lower track 38 and upper track 40 (see FIG. 5). With reference to FIGS. 2 and 3, clutch plate 84 is fastened to upper mounting bracket 14 by bolts 88 and to lower mounting bracket 12 by bolts 86. Support plate 90 is fastened to clutch plate 84 by bolts 92. Upper cross support 94 is fastened to clutch plate 84 by bolt 96 and to support plate 90 by bolt 98. Lower cross support 100 is fastened to clutch plate 84 by bolt 102 and to support plate 90 by bolt 104.

Referring to FIGS. 6, 7, 8, and 9, a coupling member comprised of pin receptacle 106 is suitably secured to drive shaft 108 so as to rotate conjointly with shaft 108. Drive shaft 108 is journaled in bearing 110 that extends through and is carried by support plate 90. Shaft 112 of first universal joint 32 is suitably secured to drive shaft 108 so that drive shaft 108 rotates conjointly with drive shaft 108. Coupling pin 116 is rigidly secured between its ends (see FIG. 9) to output coupling member 114 so that coupling pin 116 and output coupling member 114 rotate conjointly. Output coupling member 114 is suitably mounted on output shaft 115 of switch operating mechanism 10 so that output coupling member 114 and output shaft rotate conjointly. Coupler pin 116 of output coupling member 114 of switch operating mechanism 10 slidably engages a second coupling member which can be comprised of pin receptacle 106 when switch operating mechanism 10 is in the fully inserted position. Pin receptacle 106 is hollow and contains first and second notches 105 and 107 located on a diagonal line through the center of pin receptacle 106. First and second notches 105 and 107 are sufficiently large to slidably engage the ends of coupling pin 116 when switch operating mechanism 10 is fully inserted. Thus, when coupling pin 116 rotates, the ends of coupling pin 116 engage the sides of first and second notches 105 and 107 and thereby cause pin receptacle 106 to rotate conjointly with output coupling member 114. Clutch assembly 82, including pin receptacle 106, is mounted to equipment enclosure 18, and, therefore, clutch assembly 82 remains in equipment enclosure 18 when switch operating mechanism 10 is withdrawn to the test or maintenance positions. Thus, as switch operating mechanism 10 is withdrawn from equipment enclosure 18, output coupling member 114 and coupling pin 116 slide out of pin receptacle 106 and output shaft 115 (see FIG. 2) of switch operating mechanism 10 is uncoupled from drive linkage assembly 30. Torsional driving member 118 is pivotably fastened to shaft 112 by pin 120 to form universal joint 32.

The fact that first and second notches 105 and 107 are positioned one hundred eighty degrees apart on the perimeter of pin receptacle 106 provides a unique coupling position with respect to coupling pin 116, since coupling pin 116 rotates only one hundred twenty degrees when switch operating mechanism 10 is operated or tripped. Consequently, coupling pin 116 cannot engage pin receptacle 106 unless the position, i.e., switch opened or closed, of switch operating mechanism 10 is the same as the position of the switch to be operated.

Interlock disk 138 is suitably secured to shaft 112 so that shaft 112 and torsional drive member 118 cannot rotate unless interlock disk 138 also rotates conjointly with shaft 112. When switch operating mechanism 10 is fully inserted into equipment enclosure 18 and in the coupled position with output coupling member 114 and coupling pin 116 engaged with pin receptacle 106, spring loaded plunger 130 is depressed to the left in the right-hand view shown in FIG. 8 by a member (not shown) of switch operating mechanism 10 which engages spring loaded plunger 130. When spring loaded plunger 130 is depressed, locking disk 132 clears first notch 134 or second notch 136 (depending upon whether high voltage switches 25 are in the open or closed position) in interlock disk 138 so that interlock disk 138 is not restrained from rotating. Thus, when switch operating mechanism 10 is in the coupled position, mechanical interference between locking disk 132 and interlock disk 138 does not prevent shaft 112 from rotating. However, when switch operating mechanism 10 is in an uncoupled position, spring loaded plunger 130 is not depressed, and, therefore, locking disk 132 is in position to mechanically interfere with first or second notches 134 and 136 of interlock disk 138, thereby preventing interlock disk 138 from being rotated. Consequently, when switch operating mechanism 10 is in an uncoupled position, shaft 112 and torsional drive member 118 of drive linkage 30 are prevented from rotating, and, therefore, the open or closed position of high voltage switches 25 cannot change. Since switch operating mechanism 10 is a snap-acting device which rotates its output shaft rapidly from one of its two extreme positions to the other, the position of output coupling 114 and, consequently, of interlock disk 138 is always such that either first notch 134 or second notch 136 may be engaged by locking disk 132.

In addition to the interlock provided by locking disk 132 when switch operating mechanism 10 is in an uncoupled position, second interlock disk 140 provides an additional interlock to prevent the position of switches 25 from changing while equipment enclosure door 20 is in a predetermined position. Second interlock disk 140 is suitably secured to shaft 142 which is journaled in bushing 144 that extends through and is carried by plate 90. Cotter pin 148 bears against washer 146 and prevents shaft 142 from sliding out of bushing 144. Pin 150 is suitably fastened to second interlock disk 140 so as to be engagable with either first notch 152 or second notch 154, depending upon which of its two positions interlock disk 138 is in. Mechanical interference between pin 150 and interlock disk 138 prevents rotation of interlock disk 138 when second interlock disk 140 is rotated clockwise about shaft 142 so that pin 150 is engaged with first or second notch 152 or 154. When second interlock disk 140 is rotated counterclockwise about shaft 142, pin 150 is not engagable with first or second notches 152 and 154, and, therefore, when second interlock disK 140 is rotated counterclockwise, pin 150 does not mechanically interfere with interlock disk 138 so as to prevent rotation of interlock disk 138 and a change in the position of high voltage switches 25. Thus, the position of switches 25 can change only when second interlock disk 140 is rotated counterclockwise. Wire clamp 156 is suitably secured to the end of second interlock disk 140 opposite from pin 150. A bowden cable (not shown) is attached to wire clamp 156 and operably connected to a member (not shown) on the door latch (not shown) of equipment enclosure door 20. Pulling down on wire clamp 156 by means of the bowden cable (not shown) causes second interlock disk 140 to rotate counterclockwise about shaft 142 and to thereby disengage interlock disk 138. Conversely, pulling up on wire clamp 156 by means of the bowden cable (not shown) causes second interlock disk 140 to rotate clockwise about shaft 142 and to thereby engage interlock disk 138. Thus, various interlocking schemes are possible between the position of equipment enclosure door 20, the operation of switch operating mechanism 10, and the position of switches 25. For example, the door interlock may operate to prevent switches 25 from being closed when equipment enclosure door 20 is open or to prevent equipment enclosure door 20 from being opened when switches 25 are closed. Alternatively, the door interlock may operate to prevent the opening of equipment enclosure door 20 only during switch opening or closing operations, door 20 being unlocked when switches 25 are locked in either the open or closed position.

Figure 10:
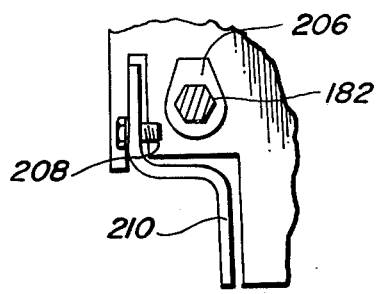
FIG. 10 is a view of the latch pin mechanism of the present invention.
Figure 11:
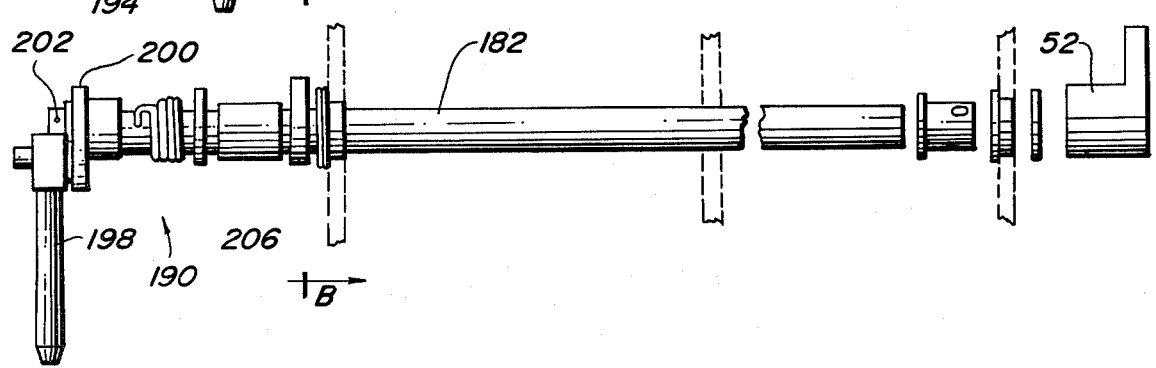
FIG. 11 is a side elevational view of the latching mechanism of the present invention.

Handle indicator 52 (shown in FIGS. 1 and 11) functions as both the drawout latch pin release lever and as an indicator that switch operating mechanism 10 is uncoupled. With reference to FIGS. 9, 10, and 11, handle indicator 52 is suitably secured to hexagonal shaft 182 of latching mechanism 180 so as to provide a means for rotating shaft 182. On the opposite end of shaft 182 from handle indicator 52 is latch pin assembly 190. Guide 192 is suitably secured to bracket 194 which is in turn suitably secured to rear channel 196 of switch operating mechanism 10. Latch pin 198 is pivotably mounted to lever 200, which is nonpivotably secured to hexagonal shaft 182 and prevented from sliding off the end of shaft 182 by cotter pin 202. Spring 204, one end of which (not shown) is anchored to rear channel 196 and the other end of which is hooked over lever 200 (see FIG. 9), provides downward bias on latch pin 198. When switch operating mechanism 10 is withdrawn to the test position, the bias provided by spring 204 will cause latch pin 198 to drop into test position notch 44 (see FIG. 5), thereby latching switch operating mechanism 10 in this uncoupled position and preventing either insertion or withdrawal until handle indicator 52 is rotated to retract latch pin 198 above notch 44. When handle indicator 52 is rotated clockwise and latch pin 198 is thereby retracted from notch 44, switch operating mechanism 10 can be either reinserted or withdrawn farther until latch pin 198 drops into maintenance position notch 46, thereby latching switch operating mechanism 10 in this uncoupled position. Handle indicator 52 permits latch pin 198 to be retracted far enough to clear notches 44 and 46 in latch plate 42, but not far enough to clear stop block 48 unless stop pin screw 208 is removed. Screw 208 is threaded through a hole in bracket 210 which is suitably secured to the frame (not shown) of switch operating mechanism 10. Cam 206 is rigidly mounted on shaft 182 and rotates conjointly with shaft 182. Cam 206 is positioned on hexagonal shaft 182 so that cam 206 strikes screw 208 when shaft 182 is rotated sufficiently for thereby limiting the rotation of shaft 182 and consequently the retraction of latch pin 198. Thus, since interference between cam 206 and screw 208 limits the retraction of latch pin 198, latch pin 198 cannot be retracted high enough to clear stop block 48, and stop block 48 thereby prevents switch operating mechanism 10 from being completely withdrawn from equipment enclosure 18 unless screw 208 is removed. Removal of screw 208 eliminates the mechanical interference between cam 206 and screw 208 and permits shaft 182 to rotate far enough to retract latch pin 198 high enough to clear stop block 48. Therefore, switch operating mechanism 10 can be completely withdrawn from equipment enclosure 18 by first removing screw 208.

Handle indicator 52 provides an indication that switch operating mechanism 10 is in its uncoupled test or maintenance positions, since when switch operating mechanism 10 is withdrawn from the coupled position, latch pin 198 bears against top surface 47 of latch bracket 42 thus causing shaft 182 and handle indicator 52 to be rotated from the "normal" position. Since latch pin 198 is extended fully downward only when switch operating mechanism 10 is withdrawn to the test position or maintenance position, rotation of handle indicator 52 to the "normal" position indicates that switch operating mechanism 10 is not in its test or maintenance positions but does not necessarily provide assurance that switch operating mechanism 10 is coupled to switch drive linkage assembly 30.

Position sensing switch 220 (see FIG. 9) electrically senses the coupled position of switch operating mechanism 10. Position sensing switch 220 is mounted on bracket 222 by bolts 224 so that switch actuating member 226 is engaged and depressed by a member (not shown) of clutch assembly 82 only when switch operating mechanism 10 is fully inserted in the coupled position. Depression of switch actuating member 226 actuates position sensing switch 220 thereby providing an electrical indication that switch operating mechanism 10 is in the coupled position.

Indicator coupling 232 (see FIG. 9) engages stub shaft 234 and pin 236 (see FIG. 8) when switch lever 54 is set to the correct position and switch operating mechanism 10 is fully inserted, as will be explained hereinafter. Referring to FIGS. 6 and 8, stub shaft 234 is journaled in bushing 238 that is carried by support plate 90. Hollow shaft 240 slides over the end of stub shaft 234 and is secured by pin 242 so that hollow shaft 240 and stub shaft 234 rotate conjointly. The other end of hollow shaft 240 is rigidly mounted to first lever 244 so that first lever 244 pivots conjointly with shaft 240. Thus, when first lever 244 pivots, stub shaft 234 is caused to rotate also. The end of first lever 244 opposite from hollow shaft 240 is pivotably connected by pin 246 to second lever 248. The other end of second lever 248 is pivotably connected to interlock disk 138 by pin 250. Thus, when interlock disk 138 rotates from one of its two positions to the other, second lever 248 causes first lever 244 to move up or down, which causes stub shaft 234 to rotate between two corresponding angular positions. Pin 236 in stub shaft 234 prevents switch operating mechanism 10 from being fully inserted unless switch operating mechanism 10 is set to the correct position, i.e., corresponding to whether high voltage switches 25 are either opened or closed. This is because interlock disk 138 rotates whenever switches 25 change position and only when switches 25 change position, as discussed above. Thus, the position of interlock disk 138, and the angular position of stub shaft 234 and pin 236, are determined by the position of switches 25.

Indicator coupling 232 (see FIG. 9) cannot engage stub shaft 234 and slide over pin 236 unless indicator coupling 232 is rotated so that slot 252 (see FIG. 9) in indicator coupling 232 aligns with pin 236. Indicator coupling 232 is suitably secured to position indicator lever 254 so that position indicator lever 254 rotates conjointly with indicator coupler 232. Indicator coupling 232 is pivotably mounted to rear channel 196. Leaf spring 256 is secured to bracket 250 by bolts 260, and bracket 258 is suitably secured to rear channel 196, thereby providing a rigid mounting for leaf spring 256. Detent 262 engages either first notch 264 or second notch 266 in position indicator lever 254, depending upon the angular position of indicator lever 254. The bias provided by leaf spring 256 prevents miscellaneous movements or vibration of switch operating mechanism 10 from causing position indicator lever 254 to move. However, an actual switch operation causes rotation of stub shaft 234 and pin 236 with sufficient torque to overcome the bias of leaf spring 256 and to rotate indicator coupling 232 and position indicator lever 254. Thus, since only actual operations of switches 25 cause position indicator lever 254 to change position, switch operating mechanism 10 cannot be coupled to drive linkage assembly 30 unless the positions of switches 25 and switch operating mechanism 10 agree.

It should be expressly understood that various modifications and changes can be made to the structure of the present invention as illustrated herein without departing from the spirit and scope of the present invention as defined in the appended claims:

I claim:

1. An improved mechanism for operating a switch comprising:
   switch operating means having an output shaft, said switch operating means being operable to cause the output shaft to rotate through a predetermined rotation in first and second directions;
   mounting means for demountably supporting said switch operating means in a coupled position;
   switch drive linkage means operably connected to the switch to be operated; and
   coupling means for engaging said switch drive linkage means with the output shaft of said switch operating means and thereby causing said switch drive linkage means to rotate conjointly with the output shaft to operate the switch when said switch operating means is inserted into the coupled position in said mounting means, said coupling means disengaging said switch drive linkage means from the output shaft of said switch operating means when said switch operating means is withdrawn from the coupled position.

2. An improved mechanism, as claimed in claim 1, wherein said coupling means comprises:
   first coupling member means operably connected to said switch drive linkage means;
   second coupling member means operably connected to the output shaft of said switch operating means for engaging said first coupling member means when the output shaft of said switch operating means is rotated to a unique position and said switch operating means is inserted into the coupled position in said mounting means, said first and second coupling member means being engageable only when the output shaft of said switch operating means is rotated to the unique position.

3. An improved mechanism, as claimed in claim 1, wherein said mounting means comprises:
   rigidly mounted first and second tracks;
   a first and second set of rollers rotatably mounted on said switch operating mechanism for engaging said first and second tracks, respectively, and thereby demountably supporting said switch operating means in said first and second tracks.

4. An improved mechanism, as claimed in claim 1, further comprising:
   switch locking means for preventing the switch from changing its position from open to closed or from closed to open when said switch operating means is not coupled to said switch drive linkage means.

5. An improved mechanism, as claimed in claim 4, wherein said switch locking means comprises:
   an interlock disk rigidly mounted to said switch drive linkage means so that said interlock disk rotates conjointly with said switch drive linkage means, said interlock disk having first and second notches;
   a locking disk for engaging the first notch of said interlock disk when said interlock disk is rotated to a first position corresponding to the switch open position and for engaging the second notch of said interlock disk when said interlock disk is rotated to a second position corresponding to the switch closed position, whereby the engagement of said locking disk with the first or second notch of said interlock disk prevents rotation of said interlock disk;
   a spring biased plunger operably connected to said locking disk for causing said locking disk to engage the first or second notch of said interlock disk, depending upon the position of said interlock disk, whenever said switch operating means is withdrawn from the coupled position in said mounting means;
   a member rigidly attached to said switch operating mechanism for engaging and depressing said plunger against the spring bias and thereby causing said locking disk to disengage the first or second notch of said interlock disk to permit rotation of said interlock disk when said switch operating mechanism is inserted into the coupled position in said mounting means.

6. An improved mechanism, as claimed in claim 1, further comprising:
   sensing means for sensing that said switch operating means is coupled to said switch drive linkage means.

7. An improved mechanism, as claimed in claim 6, wherein said sensing means comprises a limit switch rigidly attached to said switch operating means and actuated by a stationary member rigidly attached to said coupling means when said switch operating means is fully inserted in said mounting means.

8. An improved mechanism, as claimed in claim 1, further comprising:
   a door for providing access to said switch operating means;
   an interlock disk rigidly mounted to said switch drive linkage means so that said interlock disk rotates conjointly with said switch drive linkage means, said interlock disk having first and second notches;
   a pivotably mounted lever, said lever adapted to pivot between first and second positions;
   a pin rigidly mounted to said pivotably mounted lever, said pin engaging the first notch in said interlock disk when said lever is pivoted to the first position and said interlock disk is rotated to a first position corresponding to the switch open position, and said pin engaging the second notch in said interlock disk when said lever is pivoted to the first position and said interlock disk is rotated to a second position corresponding to the switch closed position, whereby the engagement of said pin with the first or second notch of said interlock disk prevents rotation of said interlock disk;

a cable operably interconnecting said lever and said door, whereby the cable causes said lever to be pivoted to the first position when said door is open and to the second position when said door is closed.

* * * * *